US007210164B1

(12) United States Patent
Jandrell

(10) Patent No.: US 7,210,164 B1
(45) Date of Patent: Apr. 24, 2007

(54) METHOD TO REMOTELY GEOLOCATE AND ACTIVATE OR DEACTIVATE VALUABLE EQUIPMENT

(76) Inventor: Louis H. M. Jandrell, 262 Prospect Dr., San Rafael, CA (US) 94901

( * ) Notice: Subject to any disclaimer, the term of this patent is extended or adjusted under 35 U.S.C. 154(b) by 781 days.

(21) Appl. No.: 10/449,984

(22) Filed: May 30, 2003

Related U.S. Application Data

(60) Provisional application No. 60/384,184, filed on May 30, 2002.

(51) Int. Cl.
*H04L 9/32* (2006.01)
(52) U.S. Cl. .................. 726/2; 726/3; 726/17; 713/192
(58) Field of Classification Search .................... 713/2, 713/168–170, 189, 192–194; 726/27, 2, 726/3, 17, 21; 380/258
See application file for complete search history.

(56) References Cited

U.S. PATENT DOCUMENTS 5,283,828 A * 2/1994 Saunders et al. ........... 713/192
6,931,525 B2 * 8/2005 Numata et al. ............. 713/100

* cited by examiner

*Primary Examiner*—Hosuk Song
(74) *Attorney, Agent, or Firm*—Tucker Ellis & West LLP

(57) ABSTRACT

A theft deterrent system that provides for the remote activation and deactivation of the protected equipment's primary functionality as well as for the geolocation of the equipment to assist in the recovery of the equipment. The remote control of the equipment's functionality is accomplished by including special circuitry in the protected equipment such that the functionality can be activated or deactivated remotely via a secure communications link. Associated with one form of such a secure link, and/or special circuitry, is the ability to determine the geolocation of the equipment. These dual features deter the theft of the equipment by rendering it useless without proper activation, and undesirable because of the locatability of the equipment and the threat of apprehension.

9 Claims, 4 Drawing Sheets

METHOD TO REMOTELY GEOLOCATE AND ACTIVATE OR DEACTIVATE VALUABLE EQUIPMENT

CROSS-REFERENCE TO RELATED APPLICATIONS

This application claims the benefit of U.S. Provisional Application No. 60/384,184, filed May 30, 2002.

STATEMENT REGARDING FEDERALLY SPONSORED RESEARCH OR DEVELOPMENT

Not applicable.

REFERENCE TO A "MICROFICHE APPENDIX."

Not applicable.

BACKGROUND OF THE INVENTION

The present invention relates generally to a system and method for tracking physical assets, and more particularly to a method and system for locating and activating or deactivating equipment.

At the present time, Financing Companies suffer significant losses due to fraud—usually in the form of Identity Theft—associated with the financing (loans, leases, revolving credit, etc.) of valuable equipment, especially computer systems for consumers. While great care is taken in attempts to validate or confirm the true identity of the prospective customer at the time of purchase, identity thieves have become sophisticated enough to largely circumvent these attempts. Therefore, once the fraudulently obtained equipment has shipped, it is presently nearly impossible to locate or recover. Consequently, the financing companies are forced to write off these very substantial losses as 'a cost of doing business.'

The methods described in this application provide means of deterring the desire of thieves to fraudulently obtain Equipment that is protected by the means of this novelty, since; (1) it makes it nearly impossible for the thieves to obtain any benefit from the stolen Equipment (it being rendered unusable through deactivation); and (2) it poses the real threat of being apprehended "red handed" when the geolocation function of this novelty is used to assist authorities in the timely location and recovery of the misappropriated Equipment.

To provide a successful deterrent to the theft of financed equipment, the equipment has to be perceived by the thieves to have characteristics that will deter their desire for the equipment because—when stolen—the equipment becomes very undesirable. This invention proposes that two such deterrents would be: (1) rendering the equipment non-functional (inactive), and (2) that the equipment could assist the authorities in locating and apprehending the thieves. Important benefits to the lessor would be that the stolen equipment has a means of recovering the equipment if it is lost or stolen or misplaced, and that the usability of the equipment can be controlled should the financing agreements become delinquent. Side benefits to the legitimate user (lessee) could be an effective means of protection of his valuable information as well as the ability to recover the equipment if lost or stolen.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

BRIEF SUMMARY OF THE INVENTION

To these ends the present invention proposes to equip the protected equipment with two functions, (1) the ability to be securely and remotely activated and deactivated—rendering the equipment inoperable when deactivated—and; (2) the ability to be remotely geolocated, making it possible for the lost or stolen equipment to be physically recovered, and consequently provide a real potential for the thieves to be apprehended.

The activation function is provided by certain additional Functionality being incorporated into the equipment design. The extra Functionality may include: (1) a memory and logic device that interacts with, or is a part of, the BIOS firmware & hardware; (2) a secure, two-way radio-communications means, and preferably; (3) a radio-location means provided by either a remote-controllable beacon transmitter; or multilateration or range-&-direction means on the equipment's radio-communication signal; or other geolocation means such as an indoor Global Satellite System (iGPS) receiver, or a combination of these means.

This extra Functionality operates integrally with the boot firmware invoked whenever the equipment is started up or reset. After the boot BIOS (basic input-output system) has initialized the equipment's primary hardware systems, but before the operating system is initiated, the Functionality checks the current activation status of the equipment, and based on that status takes various courses of action. For example, when the status indicates that the equipment has valid activation status, it allows the machine to continue starting up normally. However, depending on the particular means by which the status is invalid, the Functionality will direct the BIOS to attempt to rectify the status, failing which it will shut down the machine, and, when required, it might emit a beacon signal or cause one of the alternate methods for geolocation to be performed, thereby allowing the equipment to be found (geolocated), and recovered. The Functionality is integrated into the equipment design in such a way that attempts to remove, bypass or disable the Functionality will render the machine inoperable.

One aspect of the present invention is that it provides functionality in the Equipment that can be remotely controlled to activate and deactivate the user-functionality of the Equipment. Another aspect is functionality providing a unique, secure, remotely accessible, Equipment identification code and a secure Activation code, to be used for validation and confirmation of the activation and deactivation process. It is contemplated that the present invention would be used with encryption capability in the Functionality to protect the Activation process from being hacked—i.e. circumventing the activation/deactivation process. In the preferred embodiment, the present invention contemplates using imbedded software in the Equipment (usually associated with the basic input/output system—the "BIOS") that interacts securely with the Circuitry. Preferably, there is a secure communication link between the BIOS and the remote Activation & Deactivation Control System that may be used to remotely activate and deactivate the functioning of the target Equipment.

The Functionality of the present invention may be implemented in an ASIC device or in a combination of ASIC device, RAM, Flash ROM and ROM, or combinations of any of the above that will successfully implement the necessary security and to protect the Equipment against bypassing the intent of the invention.

Another feature that may be incorporated into the present invention is a remote geolocation capability built into the Equipment, whose function is to provide the remote Activation & Deactivation Control System with the capacity to determine the physical location of the Equipment, in order to enable the physical recovery of deactivated Equipment, and/or to validate authorized use of the Equipment.

It is further contemplated that the present invention has functionality that may be used to Activate the system once received by the designated recipient/user, or it may be used to periodically update the authorized use, or it may be used to deactivate the Equipment in the case of loss or theft and also to protect the loss of valuable data.

The present invention also contemplates that in conjunction with deactivation in case of loss or theft, the geolocation facility may be used to locate the equipment for recovery In the preferred embodiment, the present invention contemplates providing a secure method for generating unique Equipment ID and activation codes, a secure method for validating the identity of the Equipment, a secure method for transmitting both identity and authorization information, a secure method for activating the Equipment based on the validation of the Identification and Activation Codes, and A secure method of obtaining activation information through communication medium (typically via telephone or wireless or network connections), both manually and automatically Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF THE SEVERAL VIEWS OF THE DRAWING

The drawings illustrate the best mode presently contemplated of carrying out the invention.

DETAILED DESCRIPTION OF INVENTION

Figure 1:
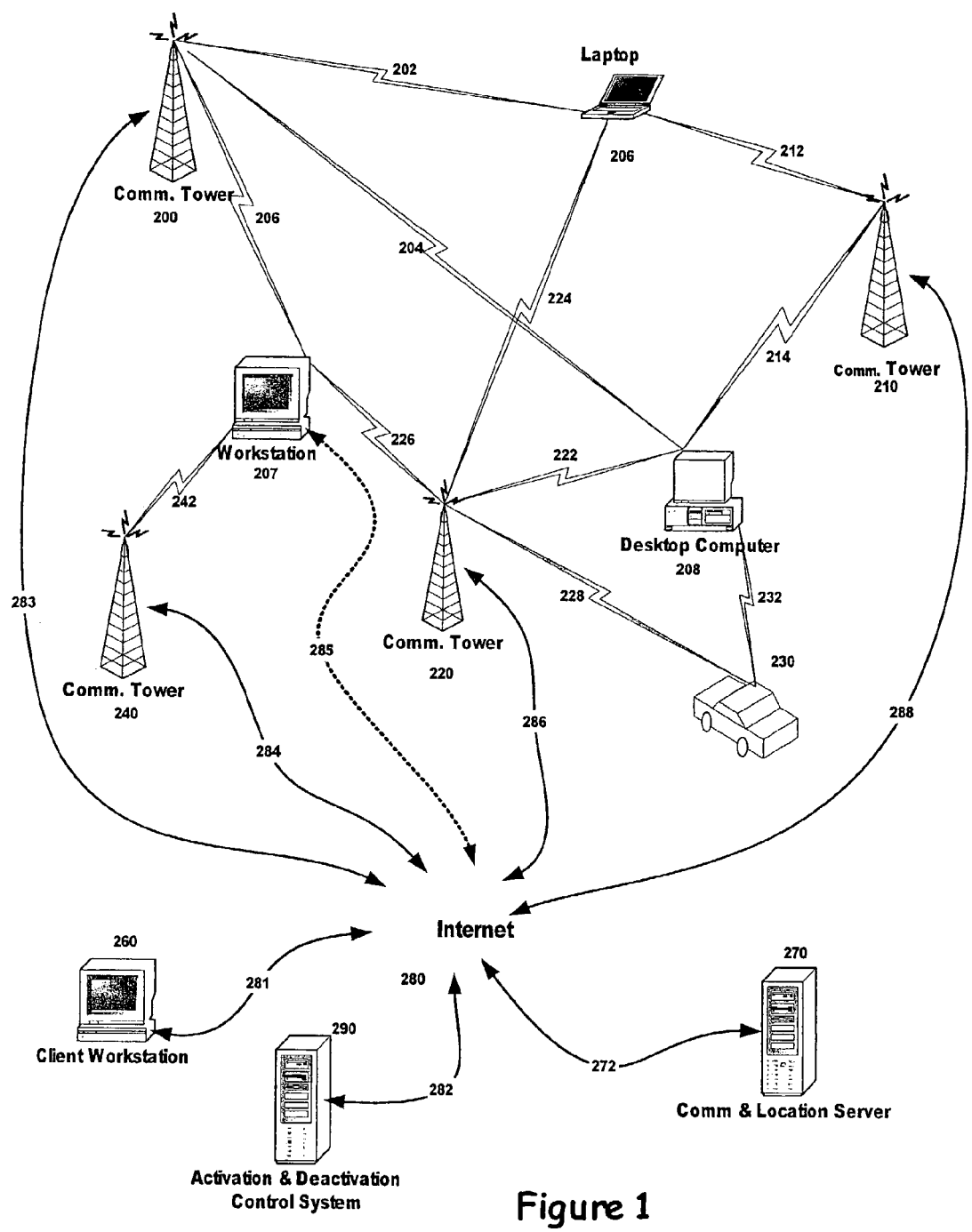
FIG. 1 is a block diagram that depicts an overview of the system elements required for the preferred embodiment of the present invention and also depicts the elements to effect the secure, remote activation and deactivation control of the equipment according to the present invention, and also depicts the geolocating elements of the system.

Referring now to FIG. 1, where an overview of the invention is shown, in which the equipment, such as Laptop 206, workstation 207 or desktop 208, are being managed and protected (by the financing organization from their workstation 260), which is connected via suitable means, such as the internet 280, to the Activation & Deactivation Control System's server 290, which is connected via suitable means such as the internet 280 to the communication and location server 270 which in turn are connected via suitable means, such as the internet 280, to the network of communication stations 200, 210, 220, 240. These Communication Towers provide a wireless links, 202, 204, 206, etc., to the protected equipment, 206, 207, 208. Alternatively, protected equipment, such as workstation 207, may be connected directly to the internet means by wireline means 285, connected to a suitable modem in the equipment.

A lessor, (a financing client of the service-organizations operating the Activation-Control and Location & Recover services) at his workstation 260 can manage the activation status of any of these machines by sending valid, secure (i.e. encrypted) messages, again via suitable means such as the internet 280, to the activation server 290. Validated requests are then routed via the communication and location server 270, which in turn sends suitable validated messages to the communication tower near the target equipment. The radio systems in the tower then securely transacts the message with the target equipment, say laptop 206, which sends a secure confirmation or response of the transaction back to the client via the reverse route.

Alternately, the equipment or the equipment operator can initiate a transaction with the activation server, as needed, whenever the equipment starts up and performs the activation validation process, and find it necessary to update or change the activation status. In this case the message routing is the reverse of that described above.

In the case where the equipment has been identified as stolen or lost, the equipment can be located whenever, for example, its locator beacon is turned on, or a position-fix is requested, by remote control from the location server. At the same time, the stolen equipment can be deactivated to prevent valuable information being lost or compromised while the equipment is being recovered by a recovery service or by law-enforcement authorities, as needed.

The equipment may also need to be located when its activation renewal status changes and an update request is transmitted to the activation server by the equipment, to validate that the equipment's financing agreement is still being met.

Geolocation of the equipment can be accomplished by various methods, such as GPS geolocation within the equipment itself, or by remote geolocation based on multilateration or ranging techniques applied to the wireless communication signals and/or beacon transmissions from the equipment.

Equipment recovery is depicted by the vehicle 230, and the signals, 228 and 232, being received from local communication tower, and/or tracking beacon, by the tracking equipment in the vehicle. Recovery of the equipment can be significantly aided by transmissions from the equipment and nearby communication towers. In this case, where recovery personnel are seeking the equipment, the above geolocation techniques would guide the recovery personnel to points near the equipment, and then they would find their way to the equipment by radio-tracking means keyed on the beacon or communication signals being transmitted by the equipment. Suitable tracking techniques include signal strength means, angle-of-arrival means, ranging means and multilateration means or combinations of the above.

Figure 2:
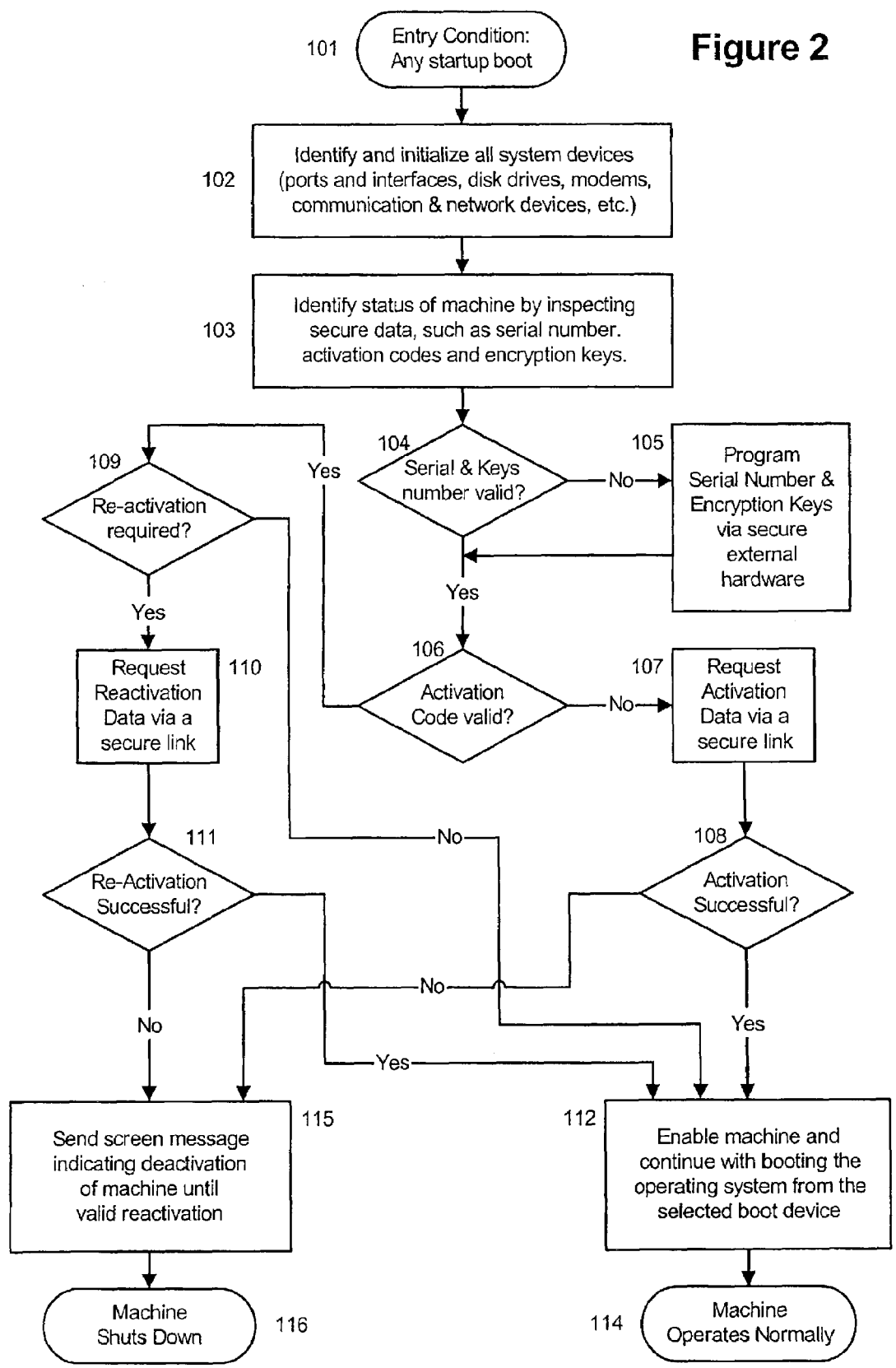
FIG. 2 shows a flow diagram depicting the basic steps in the process for providing secure activation and deactivation of the equipment according to this invention.

Referring now to FIG. 2, which shows a flow diagram of the possible operation the software program that interacts with the extra circuitry integrated into the equipment to allow it to be locally or remotely activated and deactivated.

When the equipment is turned on (step 101), the BIOS begins by identifying and initializing all the equipment's devices (step 102), such as ports and interfaces, size of memory, and installed devices such a disk drives, modems, communication and network devices, including the possible beacon transmitter, and/or radio-communication, and/or internal geolocation means. At step 103 the activation status of the equipment is identified by inspecting the secure (i.e. encrypted) activation data, such as identity data, activation codes, activation type, current time and date, and any other data pertinent to the active lease status.

If this is the very first time the data is being inspected, none of this data will have been encoded, and the equipment's serial number and encryption keys will not have been set. The program then branches to step 105 which allows the initial data to be encoded with the aid of a proprietary hardware programmer during the initial testing of the equipment during fabrication. Such a programmer consists of hardware external to the Equipment that provides the only means by which the initial data can be imparted to the secure ROM. Without such means the secure ROM cannot be altered. Further, the ROM design is such that once programmed, it cannot be altered. (I.e. it cannot be Flash ROM or EPROM.) Once encoded into the memory of the circuitry, the serial number and encryption keys cannot thereafter be altered. Further, the programmer sends the serial number and encryption key data securely to the Activation & Deactivation Control system's data base—to be used to validate secure, encrypted communications with the equipment in the future.

Thereafter, or if the serial number & keys are already programmed, the activation codes and finance contract conditions are validated. If the codes are invalid, the program branches to step 107 where the program sends a request, with user interaction, to the activation server for activation. The request may be sent via the built-in secure wireless link, or via a telephone link using the modem built into the equipment. If the activation is successful, the process continues to step 112 which allows the rest of the boot process to continue, including the loading of the equipment's operating system. If the activation process is un-successful, then the process branches to step 115, where the equipments sends a message, to the user and the server, indicating deactivation of the equipment pending reactivation. The machine then shuts down at step 116.

Returning again to step 106, if the activation is valid then at step 109 the program checks the data for whether reactivation is required, based on date and time information. If reactivation is not required the program branches to step 112 and continues as described above.

However, if reactivation is required, then the program branches to step 110, where the program sends a request, with user interaction, to the reactivation server for reactivation. The request may be sent via the built-in secure wireless link, or via a telephone link using the modem built into the equipment. If the reactivation is successful, the process continues to step 112 which allows the rest of the boot process to continue, including the loading of the equipment's operating system. If the reactivation process is not successful, then the process branches to step 115, where the equipments sends a message, to the user and the server, indicating deactivation of the equipment pending reactivation. The machine then shuts down at step 116.

Figure 3:
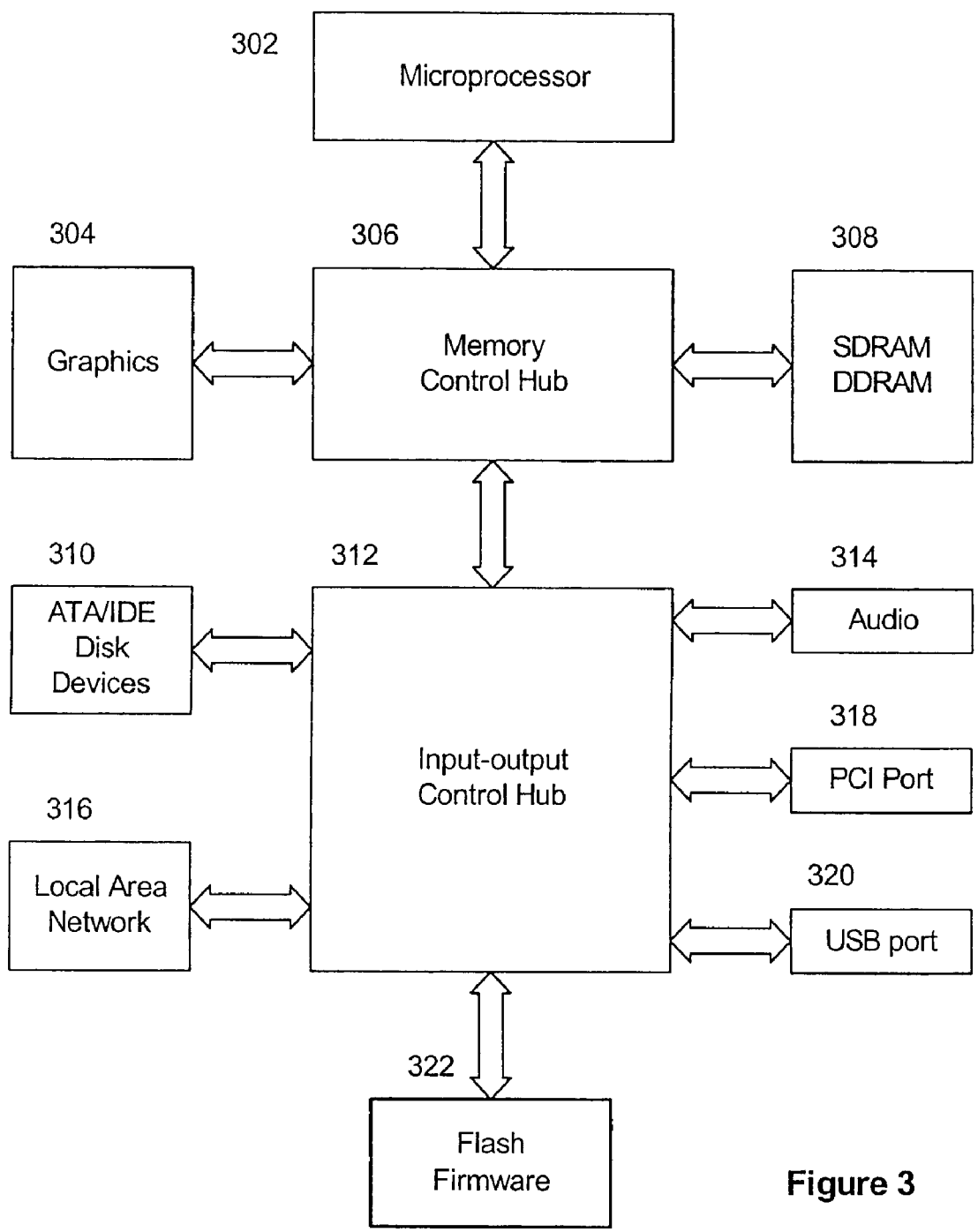
FIG. 3 depicts the major functional elements of a modern microprocessor system, (taken from the Intel spec sheet for a Pentium 4 processor and its 450 chipset.)
Figure 4:
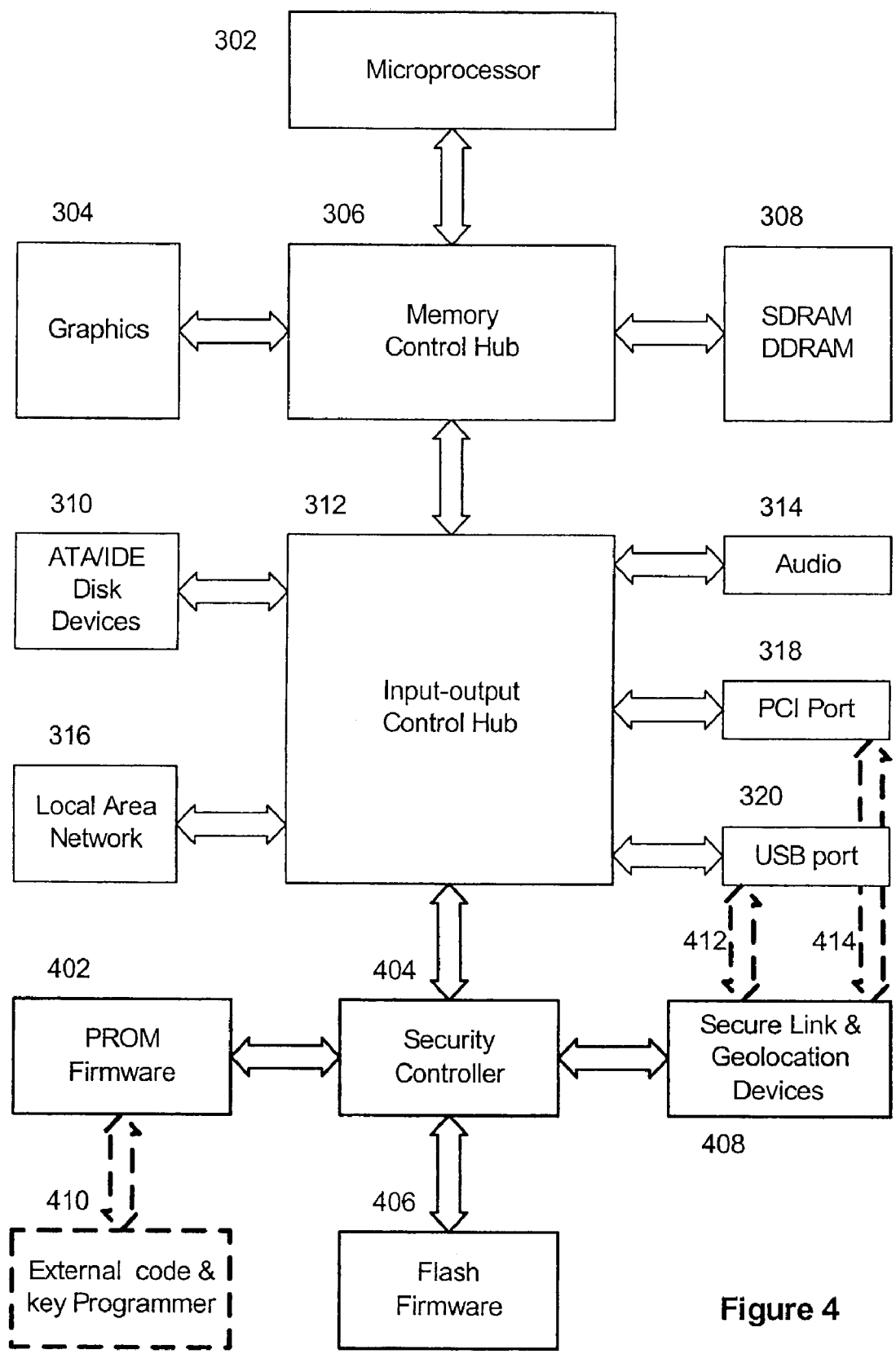
FIG. 4 depicts the additional functional elements to be integrated into the equipment design to implement the protected-equipment-elements of the invention.

FIG. 3, depicts a typical arrangement of the key elements and their functional relationships to each other in a modern microprocessor-based computer system (taking for an example the Intel 845 Chipset with the Pentium 4 Processor.). FIG. 4 depicts a contrasting arrangement of those typical elements along with the additional elements required to embody an example of the secure activation/deactivation and geolocation means of this invention. The chipset external to the processor, 306 and 312, provide data-flow paths and control logic for the functions external to the processor, 302, such as RAM 306, Graphics, 304, audio, 314, disk storage, 310, ports to local area networks, 316, external peripherals via PCI, 318, and USB, 320, port, and for control of the firmware implementing the BIOS program, resident in flash memory, 322. The virtue of this approach to firmware control is that newer, or updated, BIOS functionality can be downloaded to extend the capabilities (to interact with new developments in peripheral devices, for example) or to repair incompatibilities or errors. And therein lies a security vulnerability to providing the activation functionality by changes to the BIOS only. Access to the BIOS is available to the outside world, allowing the security-control code of the BIOS, as well as the serial number and encryption keys, to be manipulated without proper authorization, or to be bypassed altogether. Therefore, to prevent such unauthorized changes, a certain part of the basic BIOS is moved to PROM, 402 which can only be programmed once during final inspection and testing during manufacturing. When programmed by an external programming port, 410, the serial number and its associated encryption keys are stored with the basic BIOS in the PROM. The only way to change the program thereafter is by re-manufacturing the PROM. Moving a section of the BIOS code to the PROM is facilitated by the security controller, 404, which may be a component external to the chipset, or be incorporate into the chipset design. The security controller, 404, also provides secure communication with, and control of, the secure communication link and the geolocation devices, 408. As described before, these may be implemented via well known technologies, such a digital cellular-telephone, or other private wireless data systems, locator beacon, iGPS (indoor GPS), or network-based location of the communication signals, such as multilateration (TDOA), ranging and direction finding (AOA). Communication may in some case also be provided via a landline modem connected via the USB or PCI ports (path 412 or 414).

The theft-deterrent invention described provides a strong deterrent by extending control of the value of the equipment to the legitimate owner of the equipment. The control extension is provided by means for remotely activating and deactivating equipment, and for providing the geolocation and tracking-assistance for recovery authorities to aid in the recovery lost, stolen, misplaced or delinquent equipment.

The instant invention has been shown and described herein, with the example of Computer equipment, is a practical embodiment. However, it is recognized that departures, such as application to other forms of equipment dependent on electronics, may be made there from within the scope of the invention and that obvious modifications will occur to a person skilled in the art.

Although the invention has been shown and described with respect to a certain preferred embodiment, it is obvious that equivalent alterations and modifications will occur to others skilled in the art upon the reading and understanding of this specification. The present invention includes all such equivalent alterations and modifications.

What is claimed is:

1. A system, comprising:
   a wireless communications transceiver;
   an activation server;
   a communication tower;

a network connecting the activation server, communications and location server and communication tower;

a portable computing device, the portable computing device comprising a wireless transceiver and computer readable instructions for activating the portable computing device prior to the operating system loading;

wherein upon booting up, the computer readable instructions sends an activation signal from the portable computing device via the wireless transceiver to the communication tower;

wherein the communications and location server determines the location of the portable computing device;

wherein the communication tower forwards the signal to the activation server and the communications and location server via the network; and wherein when the activation server authenticates the portable computing device, an activation signal response is sent to the communication tower and the communication tower sends the activation signal response to the portable computing device, the computer readable instructions upon receiving the activation signal response then allowing the operating system to load.

2. The system of claim 1 wherein when the activation server determines the portable computing device is not authenticated, an activation denied message is sent via the network to the communication tower, the communication tower forwarding the message to the portable computing device, and the computer readable instructions deactivate the portable computing device.

3. The system of claim 1, the portable computing device further comprising a global positioning satellite system for determining a location of the portable computing device and the activation signal further comprising the location of the portable computing device.

4. The system of claim 1, the communication tower further comprises a plurality of communications towers, the communications; and the communications and location server further comprising computer readable instructions for determining a location based on received signal strength indications received from each of the plurality of communications towers a received signal strength indication via the network;

wherein when the portable computing device sends the activation signal, the communications and location server determines the location of the portable computing device.

5. The system of claim 1 wherein the activation signal further comprises an Equipment Identification Code.

6. A portable computing device, comprising:

a microprocessor;

a memory control hub coupled to the microprocessor;

an input-output control hub coupled to the memory hub;

a communications device for communicating with an external computing system; and a computer readable medium with computer readable instructions stored thereon, the computer readable instructions comprising: means for determining the activation status of the portable computing device, means adapted to disabling the portable computing device when the activation status is not valid;

wherein the communications device being responsive to the computer readable medium, and the computer readable medium is responsive to the communications device, the computer readable medium of instructions further comprises means for sending an activation message to the communications device for sending to the external computing system, means adapted to wait for a response to the activation message from the communications device, means adapted to determine from the response whether the portable computing device should be activated;

wherein the means adapted to disabling the portable computing device responsive to at least one of the means adapted to wait and the means adapted to determine, the means adapted to disable operating when one of the group consisting of the means adapted to wait has not received a response to the activation message within a predetermined time period, when an invalid response is received to the activation message, and when the response to the activation indicates the portable computing device's status is inactive.

7. The portable computing device of claim 6 further comprising a geolocation device.

8. The portable computing device of claim 7 wherein the communications device is responsive to the geolocation device, the communication device broadcasts the location of the portable computing device.

9. The portable computing device of claim 6 wherein the computer readable medium is selected from the group consisting of firmware and basic input output system.

* * * * *